M. MILLER.
WATER PURIFYING APPARATUS.
APPLICATION FILED NOV. 16, 1908.
927,267.
Patented July 6, 1909.
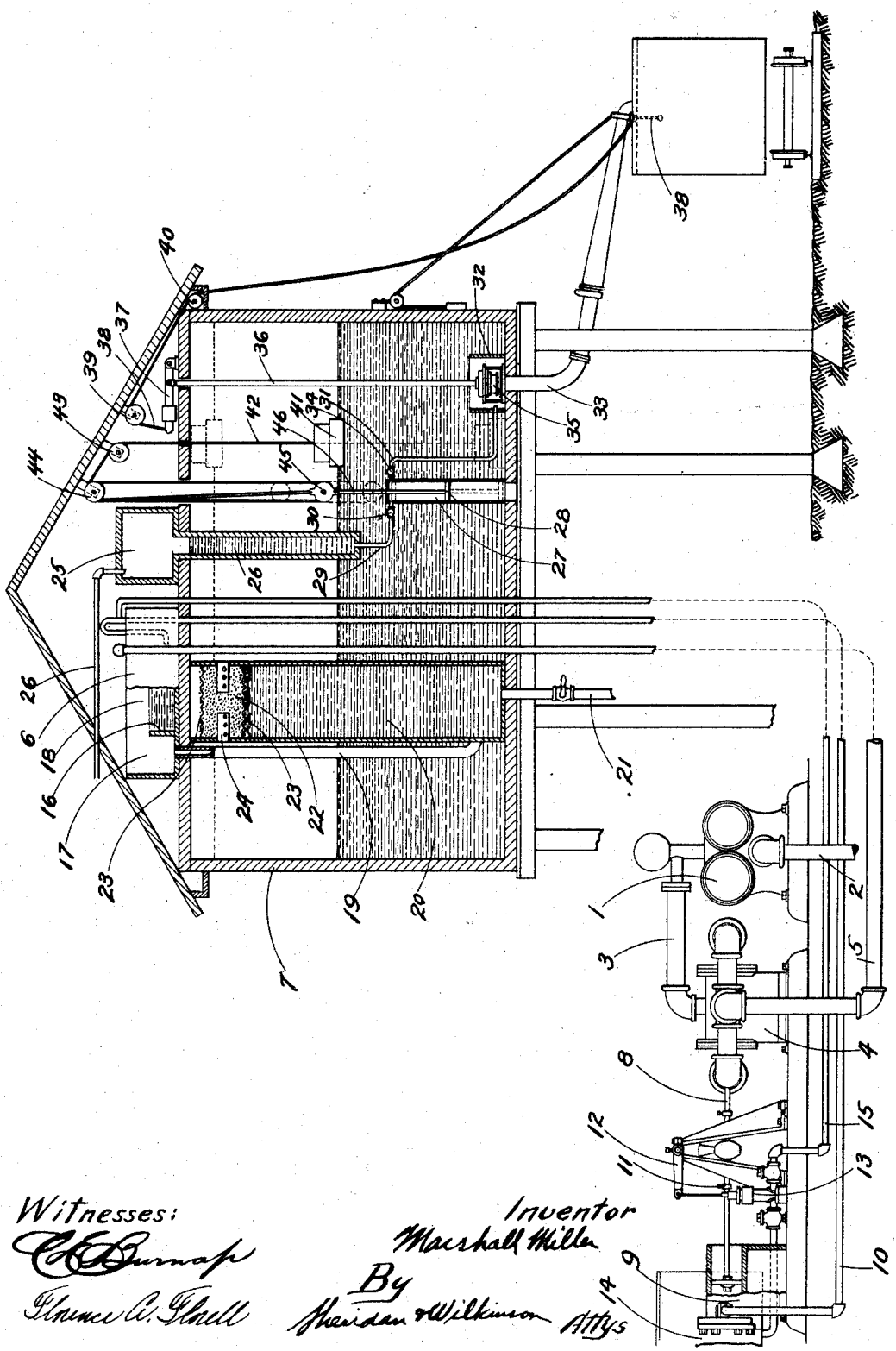
Witnesses:
Inventor
Marshall Miller
By
Sheridan & Wilkinson Attys

UNITED STATES PATENT OFFICE.

MARSHALL MILLER, OF ST. LOUIS, MISSOURI.

WATER-PURIFYING APPARATUS.

No. 927,267.  Specification of Letters Patent.  Patented July 6, 1909.

Application filed November 16, 1908. Serial No. 462,899.

*To all whom it may concern:*

Be it known that I, MARSHALL MILLER, a citizen of the United States, residing at St. Louis, State of Missouri, have invented certain new and useful Improvements in Water-Purifying Apparatus, of which the following is a specification.

The object of my invention is to provide means in a roadside water tank for treating the water with a precipitating agent such as sodium carbonate or lime water, and afterward adding to the water as it is being drawn from the tank a predetermined proportion of some reagent having the property of preventing the water from foaming or priming in the boiler of the locomotive, such foaming resulting from the large admixture of dissolved salts in those cases where a sufficient quantity of precipitating agent is used. Among the reagents commonly used to prevent priming and foaming are tannin and castor oil. I have found, however, that if these reagents are added directly to the water in the storage tank they will be largely absorbed and precipitated by the sludge thrown down in the initial treatment of the water, thus resulting in a large waste of the anti-priming substance used. Even in those cases where the initial chemical treatment and precipitation takes place in a secondary compartment separated by a filter from the main storage tank there is always a considerable deposit of sludge in the main storage tank owing to the fact that the chemical action and precipitation are not completed prior to the passage of the water through the filter into the main tank.

A further object is to accomplish the result, above referred to, automatically even in those cases where the point of withdrawal of water from the storage tank is located at a considerable distance therefrom, such a distance as would prevent the use of mechanical connections between the water outlet valve and the outlet valve for the anti-priming reagent. In the mechanism hereinafter described this object is accomplished by actuating the valve which controls the flow of anti-priming reagents by means of a float resting upon the water in the main storage tank, the upward and downward movement of said float during the withdrawal of water from the storage tank and the addition of water thereto serving to actuate the means for supplying the anti-foaming reagent.

The drawing is an elevation view partly in section of a road-side tank equipped with my invention.

Referring first to the means for supplying water to the tank and giving it its initial treatment, I employ a pump 1 of any preferred type drawing water through pipe 2 from any convenient source. From the pump 1 the water is delivered through pipe 3 to a piston motor 4, thence through the pipe 5 to the mixing tank 6 mounted in the upper part of the water storage tank 7. The piston rod 8 of the motor 4 actuates an air pump 9, which through pipe 10 delivers a stream of air into the mixing tank 6 for the purpose of agitating the contents thereof and promoting the chemical action. The piston rod 8 is provided with tappets 11 which, acting upon a bell crank 12, drive a small chemical pump 13. The pump 13 draws the chemical solution from a tank 14 and forces it through pipe 15 into the mixing tank 6. The mixing tank 6 is provided with a weir 16 forming two compartments 17 and 18, the object of the weir being to partially arrest the flow of mixed water and chemical solution in order to provide for thoroughly mingling them prior to their delivery through the pipe 19 to the lower part of the precipitation tank 20. The precipitation tank is located inside of the main storage tank and is provided at its lower end with an outlet pipe 21 through which the sludge may be drawn off, and at its top with a filter consisting of a bed of sand 22 retained between screens 23. The perforated pipes 24 embedded in the sand communicate with the main storage tank 7.

Through the mechanism above described the water and precipitating solution of sodium carbonate, lime water or other material are delivered to compartment 18 of mixing tank 6 and there agitated and mingled by the inflowing air current. Passing over the weir 16 the mingled water and precipitating agent pass into the precipitating tank 20 where the larger part of the sludge is precipitated, and the filtered water passes into the main storage tank through the perforated pipes 24. In practice, however, the precipitation is never completely finished in the precipitation tank 20 and a considerable amount of sludge therefore deposits upon the bottom of the main storage tank 7. It is to avoid contact of the anti-foaming regent with the sludge in the main storage tank that I have devised the mechanism described below, such mechanism being so designed as to be operative whether water is drawn from the roadside tank by a locomotive lying alongside, or by a locomotive at a distance drawing water through a pipe from the storage tank. Also located in the top of the main storage tank 7 is a reservoir 25 for the anti-foaming reagent such as tannin or castor oil, this reservoir being provided with an inlet pipe 26, which may lead from the outside of the tank or may otherwise communicate therewith. Leading downward from the reservoir 25 into the main storage tank is a large pipe 26, which may be ten inches or more in diameter, and is designed as the ultimate storage receptacle for the anti-foaming solution and is located inside of the storage tank to avoid freezing. At or near the bottom of the storage tank is a cylinder 27 provided with a piston 28, and a pipe 29 leads from the lower end of the pipe 26 to the upper end of said cylinder. A check valve 30 in the pipe 29 opens toward the cylinder 27. An outlet pipe 31 leads from the upper part of the cylinder 27 to the open-topped casing 32 situated at the bottom of the main storage tank and surrounding the end of the water outlet pipe 33. A check valve 34 is located in the pipe 31 and opens outwardly from cylinder 27 and toward the casing 32.

Any suitable mechanism may be employed for controlling the water outlet from the main storage tank 7. In the present instance I have shown a valve 35 of a form in common use, said valve being connected by a rod 36 with a weighted lever 37 near the top of the tank. The lever 37 is connected to a cord or chain 38 passing over pulleys 39 and 40 to the outside of the tank where the same may be conveniently manipulated by the locomotive engineer or fireman.

A float 41, sufficiently weighted to actuate the parts coöperating therewith, is connected to a cord or chain 42, which passes over fixed pulleys 43 and 44 near the top of the tank and thence around the movable pulley 45, again around the fixed pulley 44 and downward to its point of attachment to the block in which the pulley 45 is mounted. The piston 28 is connected by means of a rod or cord 46 with the casing of the pulley 45.

In operation, assuming that the pipe 26 contains a supply of the anti-foaming solution, and that the tank 14 contains a supply of the initial precipitating agent, the pump 1 is started and continued in operation until the main storage tank 7 is filled to the requisite height. The rising of the water level in the main storage tank raises the float and the piston 28 moves downward, and the opening of the check valve 30 under pressure of the anti-foaming solution in the pipe 26 permits the cylinder 27 to become filled. When the valve 35 is opened to permit an outflow of water from the main storage tank the float 41 falls, thus raising the piston 28, closing the check valve 30, opening the check valve 34 and causing an outflow of the anti-foaming solution through the pipe 31 into the casing 32 where it mingles with the outflowing stream of water. Obviously the operation will be the same whether the water is drawn from the tank into a locomotive lying alongside, or through a pipe extending to a distant point. The proportion of anti-foaming solution added to the outflowing water may be varied by varying the diameter of the cylinder 27, or by varying the amount of movement communicated to the piston 28 by the float 21, which latter variation may be accomplished by changing the arrangement of the pulley cord 42 and the number of movable pulleys. Similarly the quantity of precipitating agent drawn from the tank 14 may be varied by adjusting the tappets 11 upon the piston rod 8.

I would have it understood that I do not limit myself to the precise construction and arrangement of parts shown in the drawings and herein described, as various modifications or alterations may be made without departing from my original invention.

What I claim is:

1. In a device of the class described, a water storage tank, a valve and outlet pipe therefor, a chemical solution pump, a float in said storage tank, and actuating connections between said float and pump, said pump having a discharge opening adjacent the mouth of said outlet pipe.

2. In a device of the class described, a water storage tank, an outlet opening in the bottom thereof, a valve in said outlet opening, a wall extending upward from the bottom of said tank and surrounding said outlet opening, a chemical solution pump, a float in said storage tank, an actuating connection between said float and pump, said pump discharging into the space within said wall.

3. In a device of the class described, a water storage tank, an outlet opening and valve therefor, a pump, a plunger therefor, said pump having a discharge opening at the mouth of said outlet opening, a float in said tank, an operating connection between said float and pump acting to progressively move said plunger as the level of said water in said tank changes.

4. In a device of the class described, a water storage tank, a valve and outlet pipe therefor, a chemical supply tank within said storage tank, a cylinder, a pipe connecting said chemical supply tank with said cylinder, a check valve in said pipe opening toward said cylinder, a pipe connecting said cylinder with said outlet pipe, a check valve in said pipe opening toward said outlet pipe, a float in said storage tank, a piston in said cylinder, and actuating connections between said float and said piston.

5. In a device of the class described, a water storage tank, a valve and outlet therefor, a chemical supply tank within said storage tank, a cylinder, a pipe connecting said chemical supply tank with said cylinder, a check valve in said pipe opening toward said cylinder, a pipe connecting said cylinder with said outlet pipe, a float in said storage tank, a piston in said cylinder, a pulley, and a flexible connection passing over the said pulley and connecting said float and piston.

6. In a device of the class described, a water storage tank, a valve and outlet pipe therefor, a chemical supply tank within said storage tank, a cylinder, a pipe connecting said chemical supply tank with said cylinder, a check valve in said pipe opening toward said cylinder, a pipe connecting said cylinder with said outlet pipe, a check valve in said pipe opening toward said outlet pipe, a float in said storage tank, a piston in said cylinder, a pulley, and a flexible connection passing over said pulley and connecting said float and piston.

In testimony whereof, I have subscribed my name.

MARSHALL MILLER.

Witnesses:
THOS. H. GIST,
MARIE W. MARSHALL.